United States Patent
Zhang et al.

(10) Patent No.: US 10,785,479 B2
(45) Date of Patent: Sep. 22, 2020

(54) INTRA PREDICTION MODE SIGNALING FOR VIDEO CODING

(71) Applicant: HULU, LLC, Santa Monica, CA (US)

(72) Inventors: Wenhao Zhang, Beijing (CN); Deliang Fu, Beijing (CN); Min Gao, Beijing (CN); Chen Liu, Beijing (CN); Juncheng Ma, Beijing (CN)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 16/370,213

(22) Filed: Mar. 29, 2019

(65) Prior Publication Data
US 2019/0306499 A1 Oct. 3, 2019

Related U.S. Application Data

(60) Provisional application No. 62/650,854, filed on Mar. 30, 2018.

(51) Int. Cl.
*H04N 19/11* (2014.01)
*H04N 19/176* (2014.01)
*H04N 19/593* (2014.01)

(52) U.S. Cl.
CPC ......... *H04N 19/11* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 9,838,689 B2 | 12/2017 | Lee et al. | |
| 2014/0086323 A1* | 3/2014 | Chuang | H04N 19/186 375/240.12 |
| 2015/0172719 A1 | 6/2015 | Guo et al. | |
| 2017/0041603 A1 | 2/2017 | Oh et al. | |
| 2018/0098064 A1* | 4/2018 | Seregin | H04N 19/463 |

(Continued)

FOREIGN PATENT DOCUMENTS

| KR | 10-1585565 B1 | 1/2016 |
|---|---|---|
| KR | 10-2018-0019564 A | 2/2018 |

OTHER PUBLICATIONS

International Search Report & Written Opinion for PCT Application PCT/US2019/025042 dated Aug. 12, 2019, 14 pages.

(Continued)

*Primary Examiner* — Rebecca A Volentine
(74) *Attorney, Agent, or Firm* — Fountainhead Law Group, PC

(57) ABSTRACT

In one embodiment, a method determines if a first flag for using a most probable mode (MPM) set for intra prediction is set. When the first flag indicates the MPM set is used, the method decodes a first index for the MPM, the first index indicating a first intra prediction mode in the MPM set. When the first flag does not indicate the MPM set is being used, the method determines if a second flag for using a near-MPM set is set. When the second flag indicates the near-MPM set is being used, the method decodes a second index for the near-MPM, the second index indicating a second intra prediction mode in the near-MPM set. When the second flag does not indicate the near-MPM is being used, the method decodes a third index for a non-MPM, the third index indicating a third intra prediction mode in the non-MPM set.

20 Claims, 11 Drawing Sheets

(56) References Cited

U.S. PATENT DOCUMENTS

| | | | |
|---|---|---|---|
| 2018/0316913 A1* | 11/2018 | Jun | H04N 19/159 |
| 2019/0116381 A1* | 4/2019 | Lee | H04N 19/105 |
| 2019/0273919 A1* | 9/2019 | Lim | H04N 19/119 |
| 2019/0289301 A1* | 9/2019 | Lim | H04N 19/119 |

OTHER PUBLICATIONS

Bross et al.: "Versatile Video Coding (Draft 4)"; Joint Video Experts Team (JVET) of ITU-T SG 16 WP 3 and ISO/IEC JTC 1/SC 29/WG 11; 13th Meeting: Marrakech, MA, Jan. 9-18, 2019; 248 pages.

* cited by examiner

INTRA PREDICTION MODE SIGNALING FOR VIDEO CODING

CROSS REFERENCE TO RELATED APPLICATIONS

Pursuant to 35 U.S.C. § 119(e), this application is entitled to and claims the benefit of the filing date of U.S. Provisional App. No. 62/650,854 filed Mar. 30, 2018, the content of which is incorporated herein by reference in its entirety for all purposes.

BACKGROUND

Intra prediction mode is used in video coding frameworks in which blocks of pixels are predicted from the neighboring existing pixels. The transcoder determines the prediction direction, and the direction is signaled in overhead bits in an encoded bitstream. The overhead bits are bits other than the bits used to represent the video being compressed. A decoder decodes the encoded bitstream by using the prediction direction to determine neighboring pixels that are used to decode a current block.

An intra block prediction uses a similarity of pixels among neighboring blocks to transcode or decode the current block. The intra prediction modes include a number of different directional orientations. The directional orientation is used to predict the current block based on the content of the neighboring blocks. One method divides all the intra prediction modes into a Most Probable Mode (MPM) set and a non-MPM set. The MPM set may include a smaller number of modes than the non-MPM set.

A transcoder may select an intra prediction mode, which is one of the directional orientations, when transcoding a block. When the selected intra prediction mode falls within the MPM set, the transcoder can reduce the overhead bits in the encoded bitstream by allocating fewer bits to signal the selected intra prediction mode in the MPM set. For example, if there are only three possible modes in the MPM set, only two bits are needed to signal the intra prediction mode to use in the MPM set. However, if the intra prediction mode falls within the non-MPM set, then the transcoder uses more bits to signal the selected intra prediction mode. For example, if the non-MPM set includes 32 intra prediction modes, then five bits are needed to signal which intra prediction mode to use in the non-MPM set. It is expected that the intra prediction mode will most likely fall within the MPM set. However, as the video encoder/decoder (codec) evolves, the intra prediction directional orientations become denser (e.g., there are more possible intra prediction modes), and the likelihood of a selected intra prediction mode falling within the MPM set may decrease. Accordingly, the overhead bits spent on signaling the intra prediction mode may increase because the transcoder has to signal the intra prediction mode in the non-MPM set more often.

DETAILED DESCRIPTION

Described herein are techniques for a video coding system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments reduce the number of bits sent in an encoded bitstream by reducing the number of intra prediction mode overhead bits that are signaled in the encoded bitstream compared to the method described in the Background. Some embodiments improve the intra prediction mode signaling method by enhancing the use of Most Probable Mode (MPM) by dividing the intra prediction modes into three subsets: an MPM set, a near-MPM set, and a non-MPM set. Each set includes a number of intra prediction modes. Using the near-MPM set in addition to the MPM set increases the number of intra prediction modes that may fall within the MPM set and near-MPM set compared to using just the MPM set. This makes it more likely that the intra prediction mode may fall within the MPM set or near-MPM set. When the selected intra prediction mode falls within the MPM set or near-MPM set, the transcoder can use fewer bits to signal the intra prediction mode compared to when the intra prediction mode falls within the non-MPM set. Thus, the overhead bits used for the intra prediction mode may be reduced, and as a result, the overall video compression efficiency is improved. Also, the use of fewer overhead bits for signaling the intra prediction mode saves bandwidth for video transmission.

System

Figure 1:
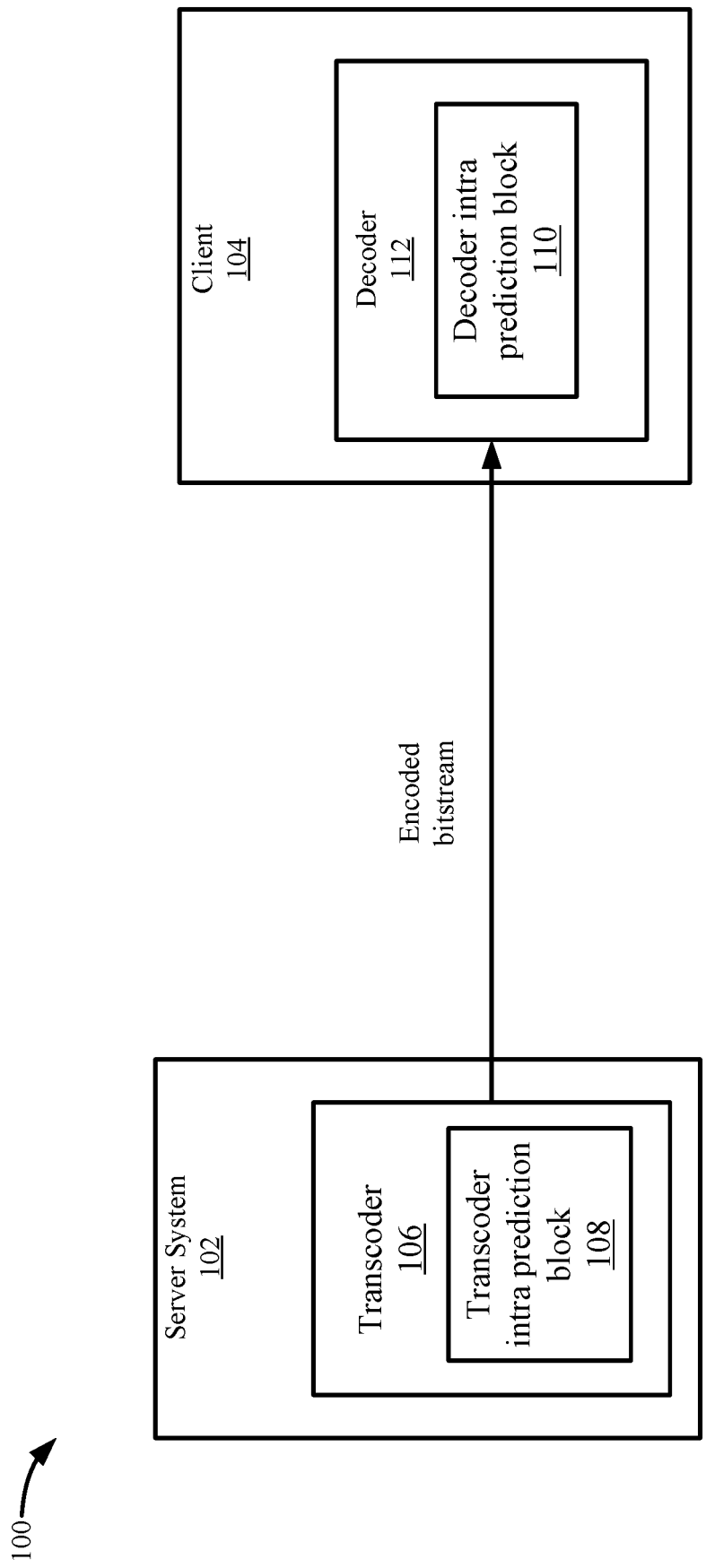
FIG. 1 depicts a simplified system for signaling an intra prediction mode according to some embodiments.

FIG. 1 depicts a simplified system 100 for signaling an intra prediction mode according to some embodiments. System 100 transcodes a source video asset, which may be any type of video, such as for a television show, movie, or video clip. The source video may need to be transcoded into one or more formats, such as one or more bitrates. In some embodiments, a server system 102 sends an encoded bitstream to client 104. For example, server system 102 may be sending a video to a client 104 for playback.

Server system 102 includes a transcoder 106 that transcodes video into an encoded bitstream. Transcoder 106 may be a software video processor/transcoder configured on a central processing unit (CPU), a hardware accelerated video processor/transcoder with a graphical processing unit (GPU), a field programmable gate array (FPGA), and/or a hardware processor/transcoder implemented in an application-specific integrated circuit (ASIC). Transcoding may be the conversion from one digital format to another digital format. Transcoding may involve decoding the source format and encoding the source video into another digital format, or converting the source content into videos with a specific resolution, framerate, bitrate, codec, etc. Also, encoding may be the conversion of analog source content and to a digital format. As used, the term transcoding may include encoding.

Transcoder 106 includes a transcoder intra prediction block 108 that determines signaling values for the intra prediction mode of blocks in a frame. Transcoder intra prediction block 108 inserts overhead bits in the encoded bitstream to signal the intra prediction mode to a decoder 112. As will be discussed below, transcoder intra prediction block 108 uses an MPM set, a near-MPM set, and a non-MPM set to signal the intra prediction mode.

Client 104 includes a decoder 112 that decodes the encoded bitstream. During the decoding process, a decoder intra prediction block 110 determines the intra prediction mode for a block and uses the mode to decode the block.

Figure 2:
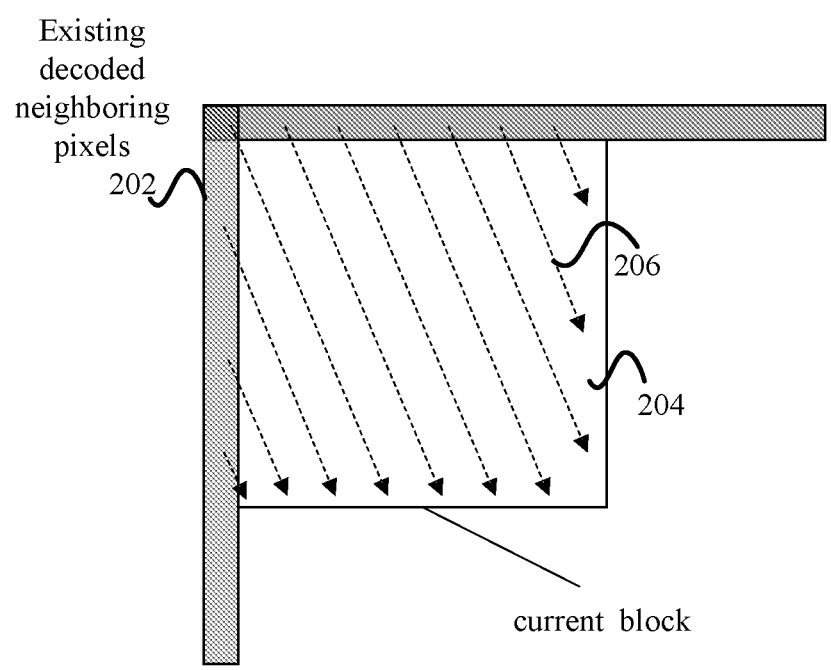
FIG. 2 depicts an example of intra prediction according to some embodiments.

FIG. 2 depicts an example of intra prediction according to some embodiments. A current block being decoded is shown at 204. Blocks to the left and top of the current block have already been decoded. The pixels from the left block and the top block may be used to predict the content of the current block. For example, neighboring pixels that have already been decoded are shown at 202. Because these pixels have already been decoded, the pixels can be used to predict the content of the current block. For example, the neighboring pixels may be similar to some of the pixels of the current block.

Intra prediction is the use of pixels within the same frame to predict the pixels of the frame. The arrows at 206 depict the direction of the intra prediction. For example, a neighboring pixel can be used to predict another pixel in the direction of the arrow originating from the neighboring pixel. The depicted direction is only one possible direction. The possible directions may include directions that range from a horizontal direction to a vertical direction including many diagonal directions in between. Other modes may also include an averaging of pixel values and do not need to include a direction. The prediction works by signaling the changes in content from the neighboring pixel instead of the entire content of the current block. When the neighboring pixel is more similar to the current block, the compression is increased because fewer changes need to be communicated.

The larger number of intra prediction modes increases the possibility of being able to signal a direction of the neighboring pixels with more accuracy, which improves the compression. In some examples, 35 intra prediction modes may be used in a standard, such as H.265/HEVC. In this standard, the number of intra prediction modes has increased from nine intra prediction modes in a previous standard (e.g., H.264/AVC). In another developing standard (e.g., H.266), the number of intra prediction modes may increase to 65. As the number of intra prediction modes goes up, the possibility that the selected intra prediction mode for a current block is within the MPM set goes down because of the larger number of possibilities that fall outside of the MPM set. Having more selected intra prediction modes fall outside of the MPM set reduces the effectiveness of using the MPM set and increases the number of overhead bits that need to be included in the encoded bitstream for intra prediction mode signaling.

One method of signaling the intra prediction modes in the encoded bitstream is to derive the intra prediction mode using MPM sets. Conventionally, the intra prediction modes are divided into a first set of MPMs and a second set of non-MPMs. An intra prediction mode in the MPM set may be referred to as an MPM and an intra prediction mode in the non-MPM set may be referred to as a non-MPM. The intra prediction modes in the MPM set may be determined based on intra prediction modes found in neighboring blocks. These intra prediction modes are used because it may be more likely the current block may have a similar intra prediction mode as a neighboring block.

When using the MPM set and the non-MPM set, a flag is used to indicate the intra prediction mode is within the MPM set, and an MPM index to select the intra prediction mode is signaled. If an intra prediction mode is not within the MPM set, then the non-MPM index is signaled. If there are three intra prediction modes in the MPM set, then the index may be two bits, and if there are 32 non-MPMs, then the index may be five bits. The number of bits needed to signal the intra prediction mode varies depending on the number of intra prediction modes in each set. If the intra prediction mode falls within the MPM set, the number of bits to signal the intra prediction mode is lowered because only two bits are used, and the video compression is increased. As the number of modes increases, the chances that the intra prediction mode falls within the MPM set goes down. For example, H.264/AVC uses two MPM modes and seven non-MPM modes, and H.265/HEVC has three MPM modes and 32 non-MPM modes. However, in the new video coding standards like Alliance for Open Media AOMedia Video 1 (AOM-AV1) and H.266, the total number of intra prediction modes has been more than 65. Due to the increasing of complexity, the existing MPM approach is less efficient. Accordingly, some embodiments use an MPM set, a near-MPM set, and a non-MPM set.

Figure 3:
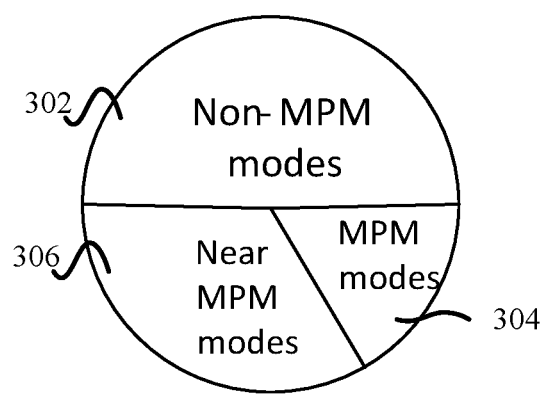
FIG. 3 depicts an example of a breakdown of the three MPM sets according to some embodiments.

FIG. 3 depicts an example of a breakdown of the three MPM sets according to some embodiments. The intra prediction modes in the MPM set at 302 are the smallest number of intra prediction modes, the intra prediction modes in the non-MPM modes at 304 have the largest number of intra prediction modes, and the intra prediction modes in the near-MPM set at 306 have a number of intra prediction modes that are in between the number in the MPM set and non-MPM set. In some embodiments, the number of near-MPMs is limited to 4, 8, 16, and so on. For example, if there are 65 intra modes, the number of modes in the MPM set, the near-MPM set, and the non-MPM set could be 3, 8, 54, respectively. Compared with the number of bits required to signal the non-MPM modes, the mode index for the MPM set and the near-MPM set could be represented in fewer bits, such as two bits for the MPM set and three bits for the near-MPM set. As a result, the overall bits spent on signaling intra modes can be saved, if the MPM set and the near-MPM set are properly selected with higher probability to be used. Using the near-MPM set reduces the number of intra prediction modes in the non-MPM set. Also, signaling the intra prediction mode in the near-MPM set uses fewer bits to send the intra prediction mode compared to signaling the intra prediction mode in the non-MPM set because the number of near-MPMs is less than the number of non-MPMs.

Even if the intra prediction mode is not in the MPM set, the intra prediction mode may tend to be close to one of the MPMs. Some embodiments use the intra prediction modes in the MPM set to select the intra prediction modes in the near-MPM set. Different methods of generating the near-MPM set can be used. For example, the near-MPM mode can be also generated based on the historical information. For example, the intra modes of past N coding units can be aggregated to derive the near-MPM modes for the current coding unit. The possible aggregation methods include ranking the historical intra modes in the coding order, or ranking the historical intra modes in by frequency of occurrence. Then the top M modes after ranking can be used as the near-MPM modes.

Also, the methods used to determine the near-MPM modes could be combined. For example, some near-MPM modes are derived from MPM modes, and the historical aggregated modes can also be added into near-MPM list.

Figure 4:
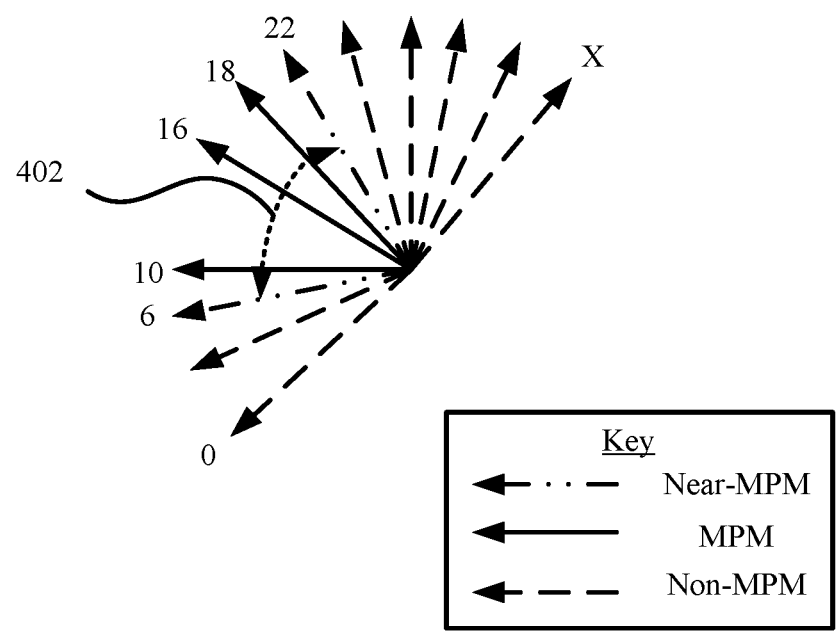
FIG. 4 depicts an example of generating an MPM set, a near-MPM set, and a non-MPM set according to some embodiments.

FIG. 4 depicts an example of generating the MPM set, the near-MPM set, and the non-MPM set according to some embodiments. The intra prediction modes are identified by index values, such as values from 0 to X, with X being a number. The intra prediction modes may be different directions or a different way to predict the current block (e.g., an average). In this example, there are three MPMs of the index values 10, 16, and 18. In some embodiments, transcoder 106 sorts the MPMs according to the index values. For example, transcoder 106 sorts the index values from lowest to highest. If there are three MPMs of 16, 10 and 18, the sorted order is 10, 16, and 18. Then, transcoder 106 sets a minimum index, MPM_min_index, and a maximum index, MPM_max_index, based on the sorting. The minimum index is 10 and the maximum index is 18 in this example.

Transcoder 106 then calculates the near-MPM set using the minimum index and the maximum index. For example, transcoder 106 selects the intra prediction modes that are a certain distance from the minimum index and the maximum index. In some embodiments, transcoder 106 selects the intra prediction modes in the near-MPM set by determining a near_MPM_min_index and near_MPM_max_index using: [MPM_min_index−N, MPM_max_index+M], where N and M are numbers that may be preset or dynamically determined based on the characteristics of the video. In one example, if MPM_min_index is 10 and MPM_max_index is 18, and N, M are the number 4, then the values of [near_MPM_min_index, near_MPM_max_index] are [10-4, 18+4]= [6, 22]. The near-MPM minimum and maximum values may be used to form a range of intra prediction modes in the near-MPM set as shown at 402. That is, transcoder 106 selects the intra prediction modes between 6 and 22 (inclusive or not inclusive of 6 and 22). Transcoder 106 removes the three MPMs of 10, 16, and 18 because they are in the MPM set. Then, the near-MPM set includes 14 modes of [6, 7, 8, 9, 11, 12, 13, 14, 15, 17, 19, 20, 21, and 22]. The non-MPM set include all the intra prediction modes not included in the MPM set and the near-MPM set.

In some embodiments, transcoder 106 uses a range for the near-MPM set that includes the MPM set because it is expected that the intra prediction mode for the current block will be around the values for the MPM set. This may be because the MPM set may include intra prediction modes from blocks that are near the current block. Because of similar video characteristics among the current block and the blocks near the current block, the intra prediction modes may be similar. In practice, the textures and edges in video content continue among multiple coding blocks, but with slightly changed directions, for example, the textures or edges move in an arc-shape. For these cases, the optimal prediction of the intra prediction mode should be in a small range of adjacent prediction angles, instead of the exact same angle from the neighboring coding blocks.

Figure 5:
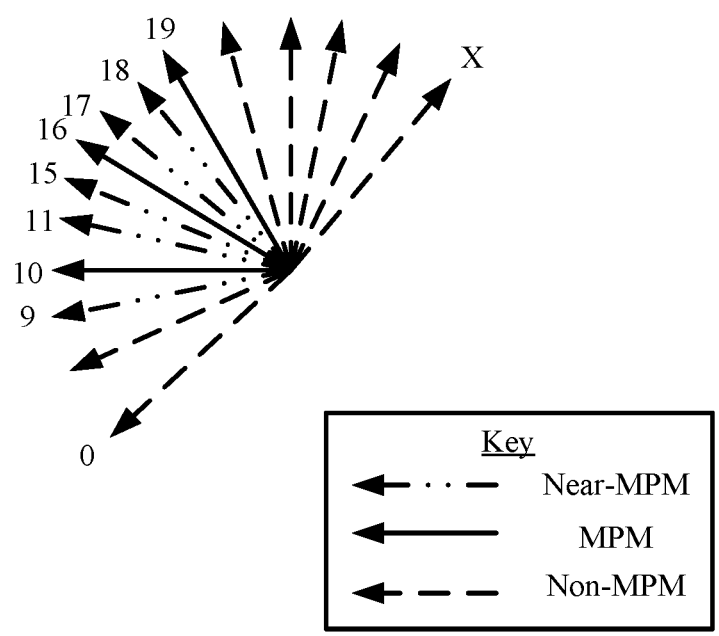
FIG. 5 depicts another example of generating the MPM set, the near-MPM set, and the non-MPM set according to some embodiments.

Transcoder 106 may calculate the near-MPM set in other ways. FIG. 5 depicts another example of generating the MPM set, the near-MPM set, and the non-MPM set according to some embodiments. Assuming the three MPMs are 10, 16, and 18, transcoder 106 determines the values of the intra prediction modes in the near-MPM based on each individual MPM value. Transcoder 106 may use the following to determine the intra prediction modes in the near-MPM set: [MPM_index−N, MPM_index+M], where N and M are numbers that may be preset or dynamically determined based on the characteristics of the video.

In one example, transcoder 106 sets the values of N and M to N=M=1. Transcoder 106 performs a loop function to review each intra prediction mode in the MPM set and generate near-MPMs. For the intra prediction mode of MPM=10, transcoder 106 adds the intra prediction modes of 9 and 11 to the near-MPM set because 10−1=9 and 10+1=11. For MPM=16, transcoder 106 adds the intra prediction modes of 15 and 17 to the near-MPM set because 16-1=15 and 16+1=17. For MPM=18, transcoder 106 adds the intra prediction modes of 17 and 19 to the near-MPM set because 18−1=17 and 18+1=19. Transcoder 106 may remove any redundant near-MPMs, if applicable. Then, the final near-MPM set is [9, 11, 15, 17, and 19]. In FIG. 5, the MPMs and non-MPMs are shown.

Transcoder 106 may use other values for N and M, such as if N=M=2, then transcoder 106 would add 8, 9 and 11, 12 for the MPM of 10, 14, 15 and 17 and 18 for the MPM of 16, and 16, 17 and 19 and 20 for the MPM of 18. One redundant value of 17 is removed in the near-MPM set. Also, transcoder 106 removes the value of 16 in the near-MPM set because it is found in the MPM set. The final near-MPM set is [8, 9, 11, 12, 14, 15, 17, 19, and 20].

In another example, transcoder 106 may continue to increase the values of N and M until there is an overlap with an intra prediction mode in the MPM set and the near-MPM set. To determine when to stop, transcoder 106 checks to see if the intra prediction mode is within the MPM set. When this occurs, transcoder 106 selects the last near-MPM set that does not include any overlap.

Once determining the MPM set, the near-MPM set, and the non-MPM set for a current block, transcoder 106 selects an intra prediction mode of the current block. Then, transcoder 106 may signal the index for the intra prediction mode to decoder 112. The number of bits to use to signal the intra prediction mode for the different sets may vary. For example, if the MPM set includes three the intra prediction modes, then transcoder 106 uses two bits to signal the intra prediction mode index. If the near-MPM set is used, transcoder 106 uses a variable number of bits based on the number of values (e.g., intra prediction modes) in the near-MPM set. However, the number of bits used to signal an intra prediction mode in the non-MPM set may be less than that signaling an intra prediction mode in the non-MPM set because the number of intra prediction modes in the non-MPM set are greater than the number of intra prediction modes in the near-MPM set. Further, the number of bits used to signal an intra prediction mode in the non-MPM set may be less than when signaling an intra prediction mode in the non-MPM set when only the MPM and non-MPM sets were used. Conventionally, five bits were used in the non-MPM set, but the near-MPM set may use fewer than five bits because there are fewer possible near-MPM intra prediction modes. If the non-MPM set is used, transcoder 106 also uses a variable number of bits based on the number of intra prediction modes in the non-MPM set. In some examples, the number of bits may be less than when signaling an intra prediction mode in the non-MPM set when only the MPM and non-MPM sets were used. For example, the number of intra prediction modes in the non-MPM set when the near-MPM set may require fewer than five bits to signal the intra prediction mode. The above savings becomes even greater because the process is performed for each block being transcoded.

Transcoder

Figure 6:
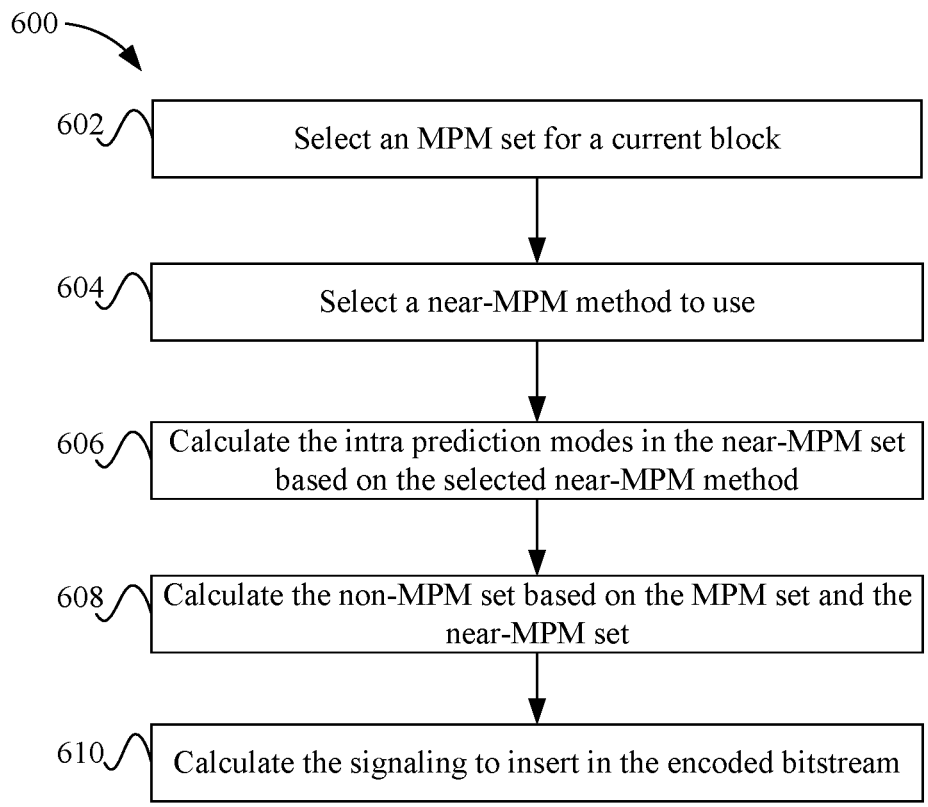
FIG. 6 depicts a simplified flowchart of a method for transcoding a video using the MPM set, the near-MPM set, and the non-MPM set according to some embodiments.

FIG. 6 depicts a simplified flowchart 600 of a method for transcoding a video using the MPM set, the near-MPM set, and the non-MPM set according to some embodiments. At 602, for a current block, transcoder 106 selects an MPM set. The MPM set may be selected based on different methods, such as by selecting intra prediction modes of neighboring blocks to the current block.

At 604, transcoder 106 selects a near-MPM method to use. One of the methods described above may be used. At 606, transcoder 106 calculates the intra prediction modes in the near-MPM set based on the selected near-MPM method. The calculation may be performed as described above. Then, at 608, transcoder 106 calculates the non-MPM set based on the MPM set and the near-MPM set. Transcoder 106 may add all the intra prediction modes that are not in the MPM set and the near-MPM set to the non-MPM set. Transcoder 106 may calculate the MPM set, the near-MPM set, and the non-MPM set for each current block being transcoded. Or, the MPM set, the near-MPM set, and the non-MPM set may be preset.

Figure 7:
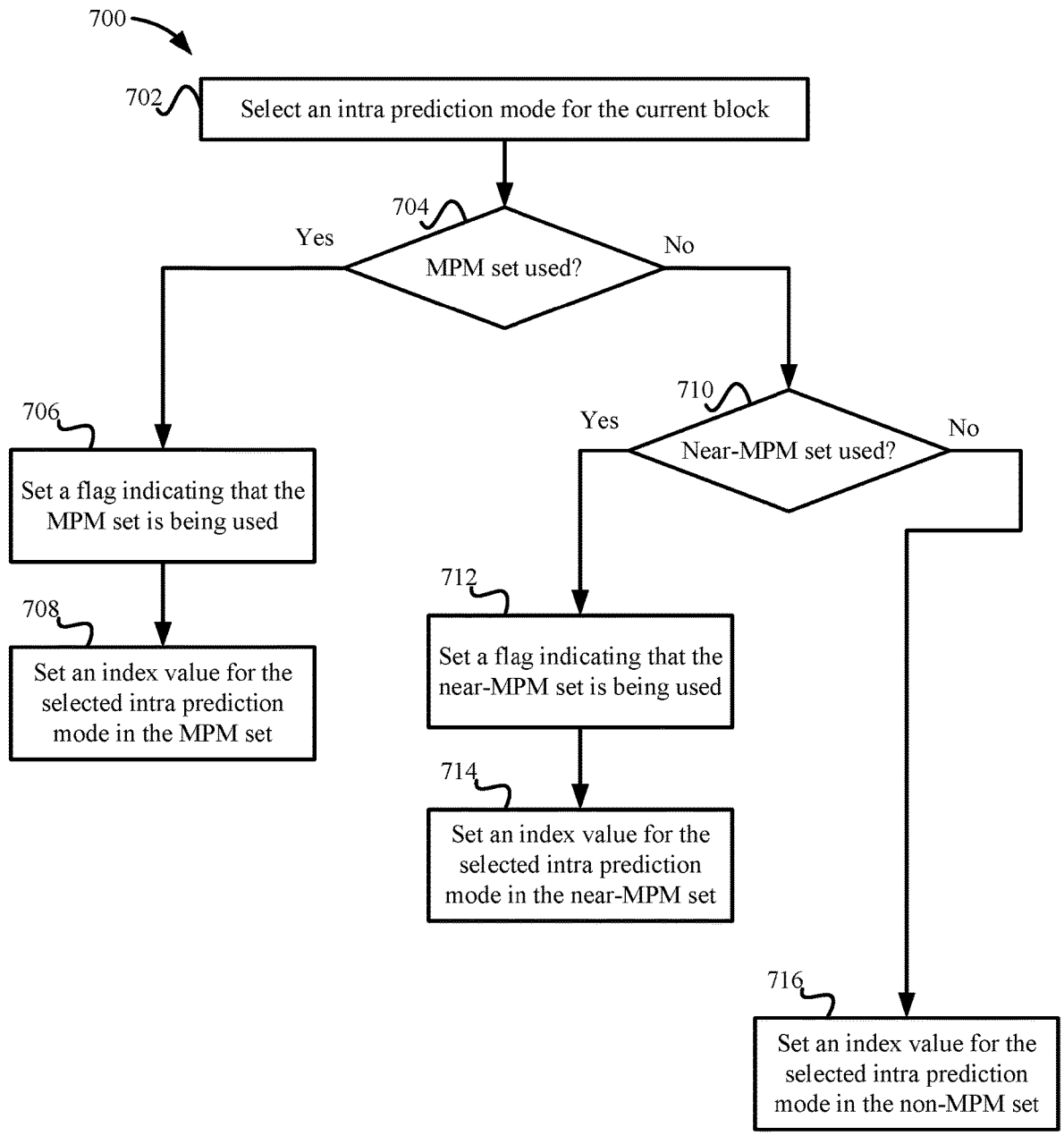
FIG. 7 depicts a simplified flowchart of a method for inserting signaling for the intra prediction mode into an encoded bitstream according to some embodiments.

Once calculating the MPM set, the near-MPM set, and the non-MPM set for the current block, at 610, transcoder 106 may calculate the signaling that needs to be inserted in the encoded bitstream. FIG. 7 depicts a simplified flowchart 700 of a method for inserting signaling for the intra prediction mode into an encoded bitstream according to some embodiments. At 702, transcoder 106 selects an intra prediction mode for the current block. At 704, transcoder 106 determines if the MPM set is being used. The MPM set is used when the selected intra prediction mode falls within one of the values in the MPM set. If so, at 706, transcoder 106 sets a flag indicating that the MPM set is being used. The flag may be a value, such as "1" to indicate that the MPM set is being used, and "0" to indicate that the MPM set is not being used. At 708, transcoder 106 also sets an index value for the selected intra prediction mode in the MPM set. The index value may be two bits in some examples when there are only three possible MPMs.

If the MPM set is not being used, at 710, transcoder 106 determines whether the near-MPM set is being used. The near-MPM set is used when the selected intra prediction mode falls within one of the values in the near-MPM set. At 712, if the selected intra prediction mode falls within the near-MPM set, transcoder 106 sets a flag indicating that the near-MPM set is being used. The flag may be a value, such as "1" to indicate that the near-MPM set is being used, and "0" to indicate that the near-MPM set is not being used, but may be other values. At 714, transcoder 106 also sets an index value for the selected intra prediction mode in the near-MPM set. The index value may be a variable number of bits depending on the number of near-MPMs. The number of near-MPMs can be pre-set based on the picture type, or coding block sizes. Specifically, I, P, B pictures can use a different number of near-MPMs; for example, coding blocks in an I picture may have more near-MPM modes than ones in P/B pictures. Or different block sizes can use different numbers of near-MPMs, such as a smaller coding block may have fewer near-MPM modes than larger ones. Decoder 112 can identify the exact range of near-MPMs according to current picture type, and/or current coding block size.

If the near-MPM set is not being used, at 716, transcoder 106 determines that the non-MPM set is being used and sets an index value for the selected intra prediction mode in the non-MPM set. The index value may be a variable number of bits depending on the number of non-MPMs. In some examples, a flag indicating that the non-MPM set is being used does not need to be set because decoder 112 assumes that the non-MPM set is being used if the flags for the MPM set and the near-MPM set are not included in the encoded bitstream.

Decoder

Figure 8:
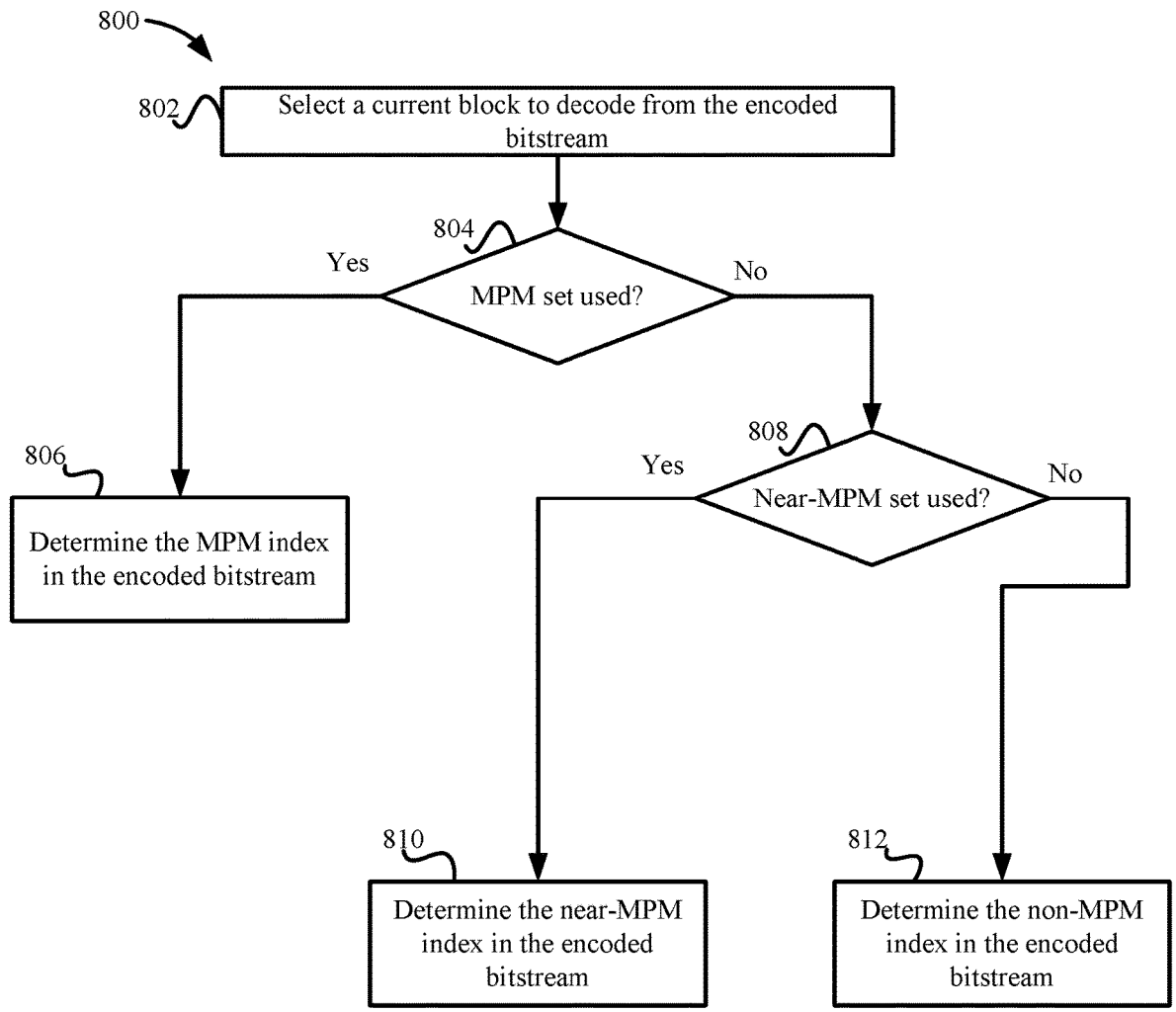
FIG. 8 depicts a simplified flowchart of a method for decoding an encoded bitstream using the MPM set, near-MPM set, and the non-MPM set according to some embodiments.

FIG. 8 depicts a simplified flowchart 800 of a method for decoding an encoded bitstream using the MPM set, the near-MPM set, and the non-MPM set according to some embodiments. At 802, decoder 112 selects a current block to decode from the encoded bitstream. In some examples, decoder 112 has already decoded some blocks from the encoded bitstream. At 804, decoder 112 determines if a flag is set that indicates that an MPM set is being used. If the flag is set to indicate that the MPM set is being used, then at 806, decoder 112 determines the MPM index in the encoded bitstream. The MPM index identifies the intra prediction mode from among the intra prediction modes in the MPM set. In some embodiments, the MPM index may be N bits depending on the possible number of intra prediction modes in the MPM set.

At 808, if the MPM flag is not set, then decoder 112 determines whether a flag is set that indicates the near-MPM set is being used. If the flag is set to indicate that the near-MPM set is being used, then at 810, decoder 112 determines the near-MPM index in the encoded bitstream. The near-MPM index identifies the intra prediction mode from among the intra prediction modes in the near-MPM set. In some embodiments, the near-MPM index may be X bits depending on the possible number of intra prediction modes in the near-MPM set.

At 812, if the near-MPM flag is not set, then decoder 112 determines the non-MPM index in the encoded bitstream. The non-MPM index identifies the intra prediction mode from among the intra prediction modes in the non-MPM set. In some embodiments, the non-MPM index may be Y bits depending on the possible number of intra prediction modes in the non-MPM set.

Figure 9:
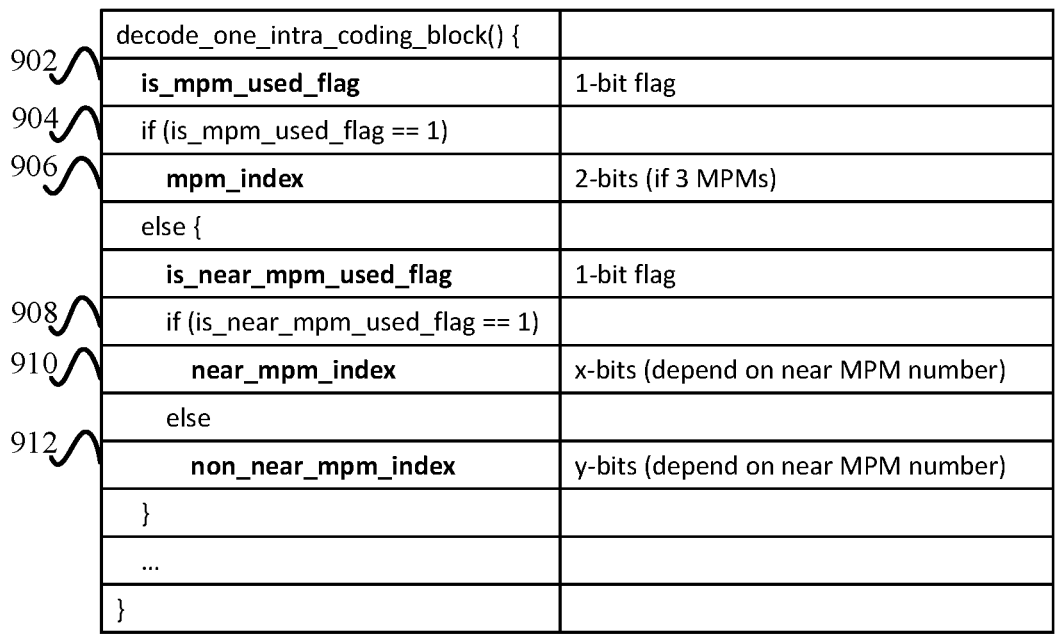
FIG. 9 depicts an example of software code to decode blocks using the intra prediction mode according to some embodiments.
Figure 10:
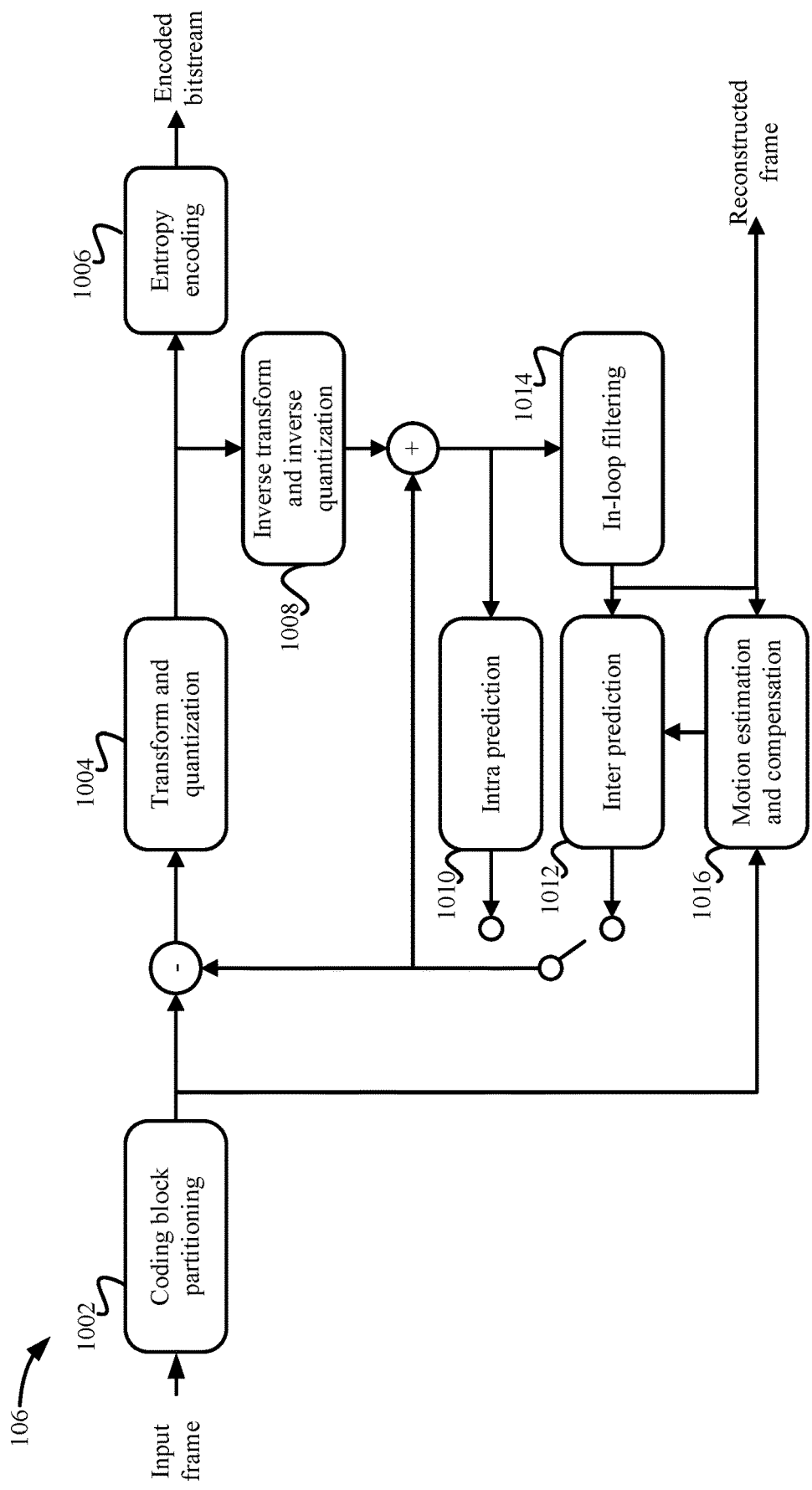
FIG. 10 depicts an example of a transcoding system according to some embodiments.

FIG. 9 depicts an example of software code to decode blocks using the intra prediction mode according to some embodiments. At 902, a flag, is_mpm_used_flag, to indicate whether MPM is used, is set. The flag may be a value that is one bit. At 904, decoder 112 determines if the is_mpm_used_flag flag is set. Setting this flag means the block being decoded uses one of the MPMs. At 906, decoder 112 determines the MPM index, which may be a value that is two bits if there are three MPMs.

If the is_mpm_used_flag is not set, at 908, decoder 112 determines if the flag is_near_mpm_used_flag is set, which indicates the near-MPM mode is being used. The flag may be a value that is one bit. If the flag is set, then decoder 112 determines the near-MPM index from the near_mpm_index at 910. The flag may be a value of X bits depending on the number of near-MPMs. If the is_near_mpm_used_flag flag is not set, then at 912, decoder 112 determines the value for the non_near_mpm_index. The flag may be a value of Y bits depending on the number of non-MPMs.

In some embodiments, the number of bits for the MPM set, near-MPM set, and the non-MPM set may be N bits<X bits<Y bits. This means that overhead bits are reduced by using the MPM set the most; however, overhead bits are still saved compared when using the near-MPM set when compared to using the non-MPM set.

Accordingly, the use of the near-MPM set may reduce the number of overhead bits that are sent in the encoded bitstream, which increases the video compression. Also, with the increase in the number of intra prediction modes, the probability that a pixel uses an intra prediction mode in the MPM set decreases. However, using the near-MPM set may increase the probability that the intra prediction mode falls within the MPM set or near-MPM set. The determination of the non-MPM set may use the values of the MPM set to select indices for the near-MPM set that most probably would be selected if the MPM set is not used.

System

Figure 11:
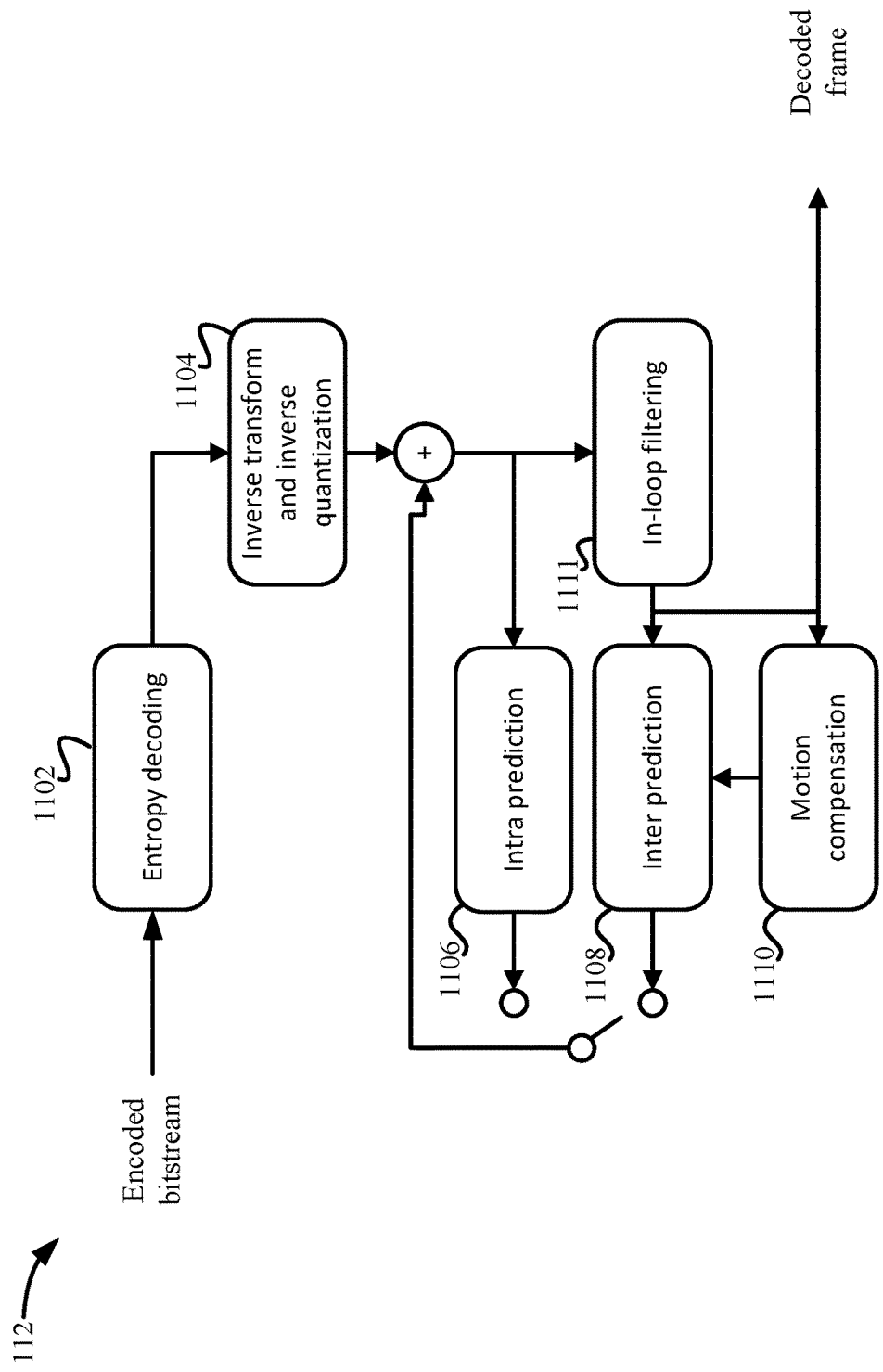
FIG. 11 depicts an example of a decoding system according to some embodiments.

FIG. 11 depicts an example of a transcoding system according to some embodiments. A video codec framework includes a set of fundamental components: block partitioning, inter and intra prediction, transform and quantization, and entropy coding.

Transcoder 106 receives a frame of a video, which is firstly split into non-overlapping coding blocks for further processing. To cope with different video content characteristics, complex regions will be covered by partitions with smaller sizes, while simple regions will be covered by larger partitions. Multiple block patterns and shapes are may be both used together, for example quad-tree pattern, triple-tree pattern and binary-tree pattern can be all used together, while square blocks and rectangular blocks can also be used together.

Prediction is used to remove the redundancy of a video signal. By subtracting the predicted pixel values from the pixels being processed, the amplitude of a residual signal can be significantly reduced, thus the resulting bitstream size can be reduced. An intra prediction block 1010, which is using reference pixels in the current frame, aims to reduce the spatial redundancy within the frame. An inter prediction block 1012, which is using reference pixels from neighboring frames, attempts to remove the temporal redundancy between frames. A motion estimation and compensation block 1016 may be a sub-module of inter prediction at the transcoder side, which captures the motion trace of objects among adjacent frames and generates reference pixels for inter prediction.

A transform and quantization block 1004 uses the residual pixels after intra or inter prediction. Transform and quantization block 1004 performs a transform operation that represents the residual signal in a frequency domain. Considering the human visual system is more sensitive on low frequency components of video signal than the high frequency components, quantization is designed to further compress the residual signal by reducing the precision on high frequency signals.

To avoid the out-of-sync issue between transcoder 106 and decoder 112, transcoder 106 contains decoding modules to make sure both transcoder 106 and decoder 112 are using identical mathematical processes. Thus, an inverse transform and inverse quantization block 1008 is similar to the same block on the decoder side. Inverse transform and inverse quantization block 1008 reconstructs pixels using the intra and inter prediction.

An in-loop filter 1014 removes any visual artifacts that are introduced by the above-mentioned processes. Various filtering methods are applied on the reconstructed frame in a cascaded way to reduce different artifacts, including but not limited to the blocking artifacts, mosquito artifacts, color banding effects, etc.

An entropy encoding block 1006 may further compress the bitstream using a model-based method. Transcoder 106 transmits the resulting encoded bitstream to decoder 310 over a network or other types of medium.

FIG. 11 depicts an example of a decoding system according to some embodiments. Decoder 112 receives the encoded bitstream and inputs it into an entropy decoding block 1102 to recover the information needed for decoding process. As above-mentioned, a decoded frame can be decoded by using an inverse transform and inverse quantization block 1104, an intra prediction block 1106 or inter prediction block 1108, motion compensation block 1110, and in-loop filtering block 1111 in the same way to build a decoded frame.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, if a first flag for using a most probable mode (MPM) set for intra prediction is set;
   when the first flag indicates the MPM set is used, decoding, by the computing device, a first index for the MPM set, the first index indicating a first intra prediction mode in the MPM set;
   when the first flag does not indicate the MPM set is being used, determining, by the computing device, if a second flag for using a near-MPM set is set;
   when the second flag indicates the near-MPM set is being used, decoding, by the computing device, a second index for the near-MPM set, the second index indicating a second intra prediction mode in the near-MPM set, wherein indices in the near-MPM set are selected by:
   a second number of intra prediction modes that are aggregated using historical intra prediction modes from a plurality of blocks, and
   a third number of intra prediction modes that are determined from the MPM set, and a fourth number of intra prediction modes that are based on the second number of intra prediction modes and the third number of intra prediction modes; and when the second flag does not indicate the near-MPM set is being used, decoding, by the computing device, a third index for a non-MPM set, the third index indicating a third intra prediction mode in the non-MPM set.

2. The method of claim 1, wherein at least a portion of the indices in the near-MPM set are selected based on a spanning subspace in the MPM set.

3. The method of claim 1, wherein at least a portion of the indices in the near-MPM set are selected by:
sorting indices in the MPM set; and
selecting indices in the near-MPM set based on a lowest index in the MPM set and a highest index in the MPM set.

4. The method of claim 3, wherein the at least a portion of the indices in the near-MPM set are selected by:
subtracting a first number from the lowest index to generate a first near-MPM index value; and
adding a second number to the highest index to generate a second near-MPM index value.

5. The method of claim 4, wherein the at least a portion of the indices in the near-MPM set are included in a range using the first near-MPM index value and the second near-MPM index value, with MPM indices excluded from the near-MPM set.

6. The method of claim 1, wherein at least a portion of the indices in the near-MPM set are selected by:
selecting indices in the near-MPM set based on the index of each intra prediction mode in the MPM set; and
removing any redundant indices in the near-MPM set.

7. The method of claim 6, wherein the at least a portion of the indices in the near-MPM set are selected by:
subtracting a first number from each index of an intra prediction mode in the MPM set to generate a second number; and
adding a third number to each index of an intra prediction mode in the MPM set to generate a fourth number.

8. The method of claim 7, wherein the at least a portion of the indices in the near-MPM set are included in a range using the second number and the fourth number, with MPM indices excluded.

9. A method comprising:
selecting, by a computing device, a block to transcode in a video;
selecting, by the computing device, an intra prediction mode for the block;
selecting, by the computing device, an MPM set that includes a first number of intra prediction modes;
aggregating, by the computing device, historical intra prediction modes from a plurality of blocks to select a second number of intra prediction modes;
analyzing, by the computing device, the MPM set to select a third number of intra prediction modes;
adding, by the computing device, a fourth number of intra modes to a near-MPM set based on the second number of intra prediction modes and the third number of intra prediction modes;
adding, by the computing device, a fifth number of intra prediction modes to a non-MPM set; and
setting, by the computing device, a flag in an encoded bitstream for the video indicating whether the intra prediction mode falls within the MPM set, the near-MPM set, or the non-MPM set.

10. The method of claim 9, wherein analyzing the MPM set to select the third number of intra prediction modes comprises:
selecting at least a portion of indices in the near-MPM set based on a range of indices from a first index in the MPM set to a second index in the MPM set.

11. The method of claim 9, wherein analyzing the MPM set to select the third number of intra prediction modes comprises:
sorting indices in the MPM set; and
selecting at least a portion of the indices in the near-MPM set based on a lowest index in the MPM set and a highest index in the MPM set.

12. The method of claim 11, wherein at least a portion of the indices in the near-MPM set are selected by:
subtracting a first number from the lowest index to generate a first near-MPM index value; and
adding a second number to the highest index to generate a second near-MPM index value.

13. The method of claim 12, wherein the at least a portion of the indices in the near-MPM set are included in a range using the first near-MPM index value and the second near-MPM index value, with MPM indices excluded from the near-MPM set.

14. The method of claim 9, wherein analyzing the MPM set to select the third number of intra prediction modes comprises:
selecting in the near-MPM set based on merging neighboring modes in the MPM set.

15. The method of claim 9, wherein analyzing the MPM set to select the third number of intra prediction modes comprises:
selecting at least a portion of the indices in the near-MPM set based on the index of each intra prediction mode in the MPM set; and
removing any redundant indices in the near-MPM set.

16. The method of claim 15, wherein the at least a portion of the indices in the near-MPM set are selected by:
subtracting a first number from each index of an intra prediction mode in the MPM set to generate a second number; and
adding a third number to each index of an intra prediction mode in the MPM set to generate a fourth number.

17. The method of claim 16, wherein the at least a portion of the indices in the near-MPM set are included in a range using the second number and the fourth number, with MPM indices excluded.

18. A non-transitory computer-readable storage medium having stored thereon computer executable instructions, which when executed by a computing device, cause the computing device to be operable for:
determining if a first flag for using a most probable mode (MPM) set for intra prediction is set;
when the first flag indicates the MPM set is used, decoding a first index for the MPM set, the first index indicating a first intra prediction mode in the MPM set;
when the first flag does not indicate the MPM set is being used, determining if a second flag for using a near-MPM set is set;
when the second flag indicates the near-MPM set is being used, decoding a second index for the near-MPM set, the second index indicating a second intra prediction mode in the near-MPM set, wherein indices in the near-MPM set are selected by:
a second number of intra prediction modes that are aggregated using historical intra prediction modes from a plurality of blocks, and a third number of intra prediction modes that are determined from the MPM set, and a fourth number of intra prediction modes that are based on the second number of intra prediction modes and the third number of intra prediction modes; and when the second flag does not indicate the near-MPM set is being used, decoding a third index for a non-MPM set, the third index indicating a third intra prediction mode in the non-MPM set.

19. The non-transitory computer-readable storage medium of claim 18, wherein at least a portion of the indices in the near-MPM set are selected based on a spanning subspace in the MPM set.

20. A non-transitory computer-readable storage medium having stored thereon computer executable instructions, which when executed by a computing device, cause the computing device to be operable for:

selecting a block to transcode in a video;

selecting an intra prediction mode for the block;

selecting an MPM set that includes a first number of intra prediction modes;

aggregating historical intra prediction modes from a plurality of blocks to select a second number of intra prediction modes;

analyzing the MPM set to select a third number of intra prediction modes;

adding a fourth number of intra modes to a near-MPM set based on the second number of intra prediction modes and the third number of intra prediction modes;

adding a fifth number of intra prediction modes to a non-MPM set; and setting a flag in an encoded bitstream for the video indicating whether the intra prediction mode falls within the MPM set, the near-MPM set, or the non-MPM set.

* * * * *